Sept. 22, 1959 P. R. COOK 2,904,891
LAYOUT MEANS FOR USE IN MASONRY CONSTRUCTION
Filed Feb. 5, 1957 2 Sheets-Sheet 1

INVENTOR.
PAUL R. COOK
BY Barnes & Lead
attys.

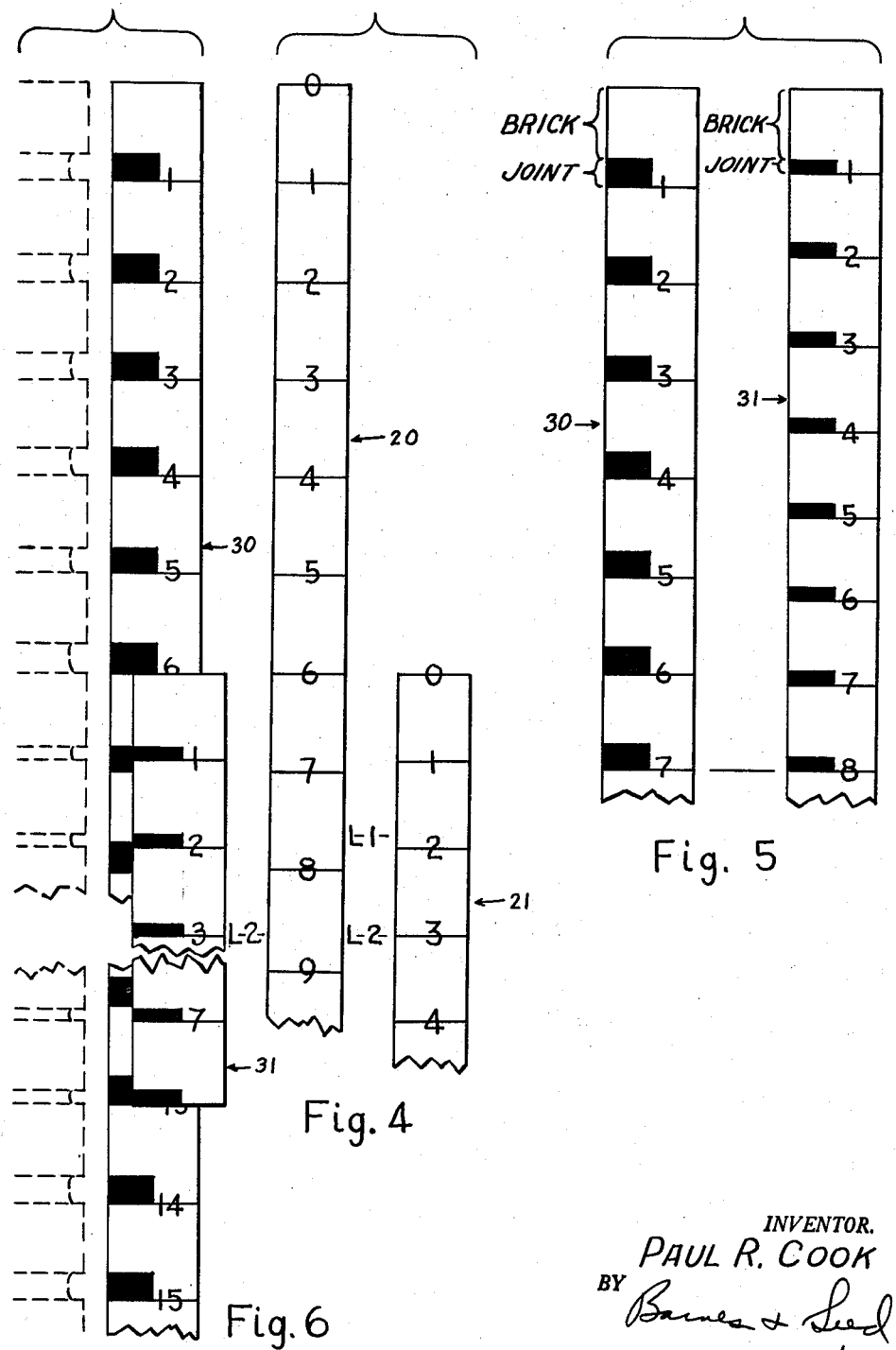

United States Patent Office 2,904,891
Patented Sept. 22, 1959

2,904,891

LAYOUT MEANS FOR USE IN MASONRY CONSTRUCTION

Paul R. Cook, Seattle, Wash.

Application February 5, 1957, Serial No. 638,317

2 Claims. (Cl. 33—111)

The present invention relates to layout guides or scales for determining the number of masonry units and the bonding joint thickness necessary to cover a given distance, and is especially designed for the vertical layout of brick courses.

In the vertical layout of brick walls is has been the mason's practice to hand-mark a story pole with the location of the individual courses, starting at the uppermost course and working down to the bottom course, while taking into consideration openings such as for windows and doors. Since the courses frequently do not come out even for a given brick size and joint thickness at the top and bottom of such openings the mason must vary the joint thickness somewhat to make the desired result possible. The amount of joint variance to use has been largely a hit or miss proposition. As a result a surprisingly large percentage of the mason's time has been consumed in vertical layout work. Furthermore, such layout normally requires the services of an experienced artisan as distinguished from an apprentice mason or an amateur doing his own work.

In view of these difficulties the present invention aims to provide a simplified guide means for masonry layout which will automatically indicate the proper joint thickness to give an even number of courses over a given distance and the use of which can be easily understood with very little instruction.

A further object of the invention is to provide such a layout guide means which can be manufactured cheaply enough to make it economically feasible to retain the same in the completed structure.

With yet additional objects and advantages is view which, with the foregoing, will appear and be understood in the course of the following description and claims, the invention consists in the novel construction and in the adaptation and combination of parts hereinafter described and claimed.

In the accompanying drawings:

Figures 1–4 are plan views illustrating diagrammatically the vernier principle utilized by my invention.

Fig. 5 is a plan view of strips with indicia patterns illustrating a simple form of my invention.

Fig. 6 is a schematic view of a wall with the strips of Fig. 5 thereon to obtain an even brick course at a predetermined level below the top of the wall.

Figure 1:
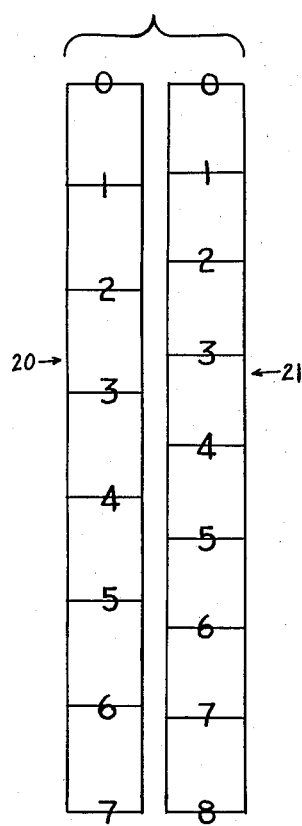
Figure 2:
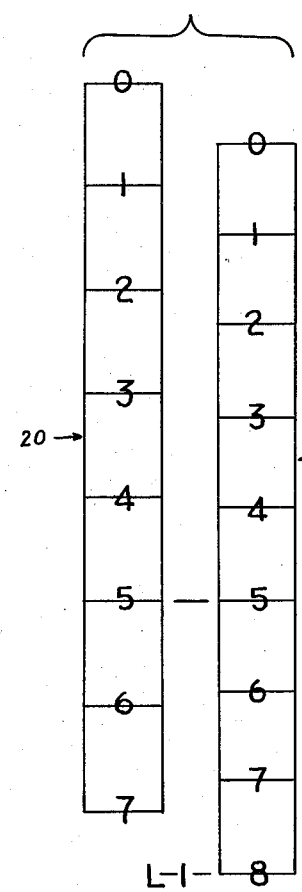

As background for a ready understanding of my invention, in Fig. 1, I have illustrated two diagrammatic strips 20, 21 with graduated indicia patterns therealong which have a vernier relationship, that is to say, a certain number of the intervals or divisions of each of the patterns has a length equal to that of one more or one less number of divisions of the other pattern. In the example illustrated in Fig. 1, it is seen that seven divisions on strip 20 have the same combined length as eight divisions on strip 21. Accordingly, a division on strip 20 can be subdivided into fractions having eight as the denominator by selectively moving strip 21 downwardly with respect to strip 20 until one of the graduations of strip 21 is directly opposite a graduation on strip 20. In Fig. 2 I have illustrated a situation in which strip 21 has been so moved until the 5 graduations on the scales are aligned and in this position the top of strip 21 has moved 5/8 of the length of one of the divisions on strip 20, the numerator of this fraction being determined by the numeral of the graduation on strip 21 which is thus aligned.

Figure 3:
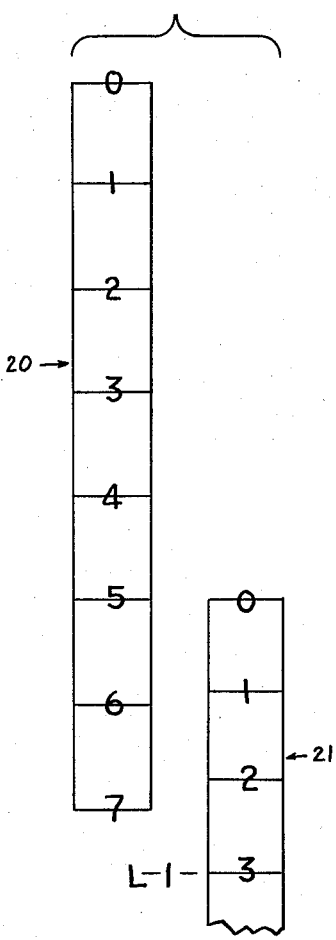

In Fig. 2 the 8 graduation on strip 21 is of course as far below the 7 graduation on strip 20 as the top of strip 21 is below the top of strip 20. Indicating the location of this 8 graduation by level L–1 it can be seen from Fig. 3 that if the top of strip 21 is moved down to the 5 graduation of strip 20, the 3 graduation on strip 21 will arrive at L–1. In like manner, if strip 20 is continued in length as in Fig. 4 and level L–1 is moved a full graduation of the indicia pattern on strip 20 downwardly to become level L–2, then if graduation 3 on strip 21 is in turn moved to L–2 the top of strip 21 will be opposite graduation 6 on strip 20. In like manner, if L–2 were moved halfway between graduations 8 and 9 on strip 20 the top of strip 21 would be opposite graduation 5 on strip 20 if strip 21 were moved up to bring its graduation 4 opposite L–2. The significance of this discussion so far is to show that as long as a point is located between graduations on strip 20 such as to divide the distance therebetween into a fraction having the number of graduations on strip 21 as the denominator, there will be a graduation on strip 21 which, when placed at the point, will at the same time align the top of strip 21 with one of the graduations on strip 20. Of course, the more the vernier graduations of the indicia pattern on strip 21 the greater is the chance that alignment can occur.

Continuing to Fig. 5, it is seen that strips 20, 21 have been modified as strips 30, 31, respectively, the modification being that each graduation of both indicia patterns has been subdivided to indicate a common brick thickness commencing at the top of the graduation. The remaining part of each graduation of the indicia patterns has been darkened to indicate a respective joint thickness. It will be seen that the joints on strip 30 are wider than the joints on strip 31 since the indicia pattern on strip 30 has one less graduation than the pattern on strip 31 for a common vernier length.

In Fig. 6 I have indicated by broken lines a brick wall which for proper appearance should have an even course at level L–2 which might, for example, be at the head of a window or door. It will be apparent by reference to Fig. 4 that if strip 30 starts at the top of the wall and is overlaid by strip 31 commencing at graduation 6, graduation 3 on strip 31 will be located at L–2. Thus it is seen that the indicia patterns on strips 30, 31 can collectively indicate a pattern of joints which will give the start of a course at level L–2 as well as at the top of the wall. The first six joints will be indicated by strip 30 while the next three joints will be slightly narrower as indicated by strip 31. It should be noted that graduation 8 on strip 31 will coincide with graduation 13 of scale 30 so that at this level the original joint thickness can be resumed if desired. Similarly, if an even course level was required to be half-way between graduations 8 and 9 on strip 30, then the latter would be overlaid by strip 31 commencing at graduation 5 on strip 30 and the original joint thickness could be resumed at the level of graduation 12 on strip 30.

The indicia patterns may be printed or otherwise marked on paper or fabric tape, wood, plastic, or fibreboard strips, etc., which can be secured, as by adhesive, nails, or staples, on the building structure and left embedded in the finished wall.

Figure 7:
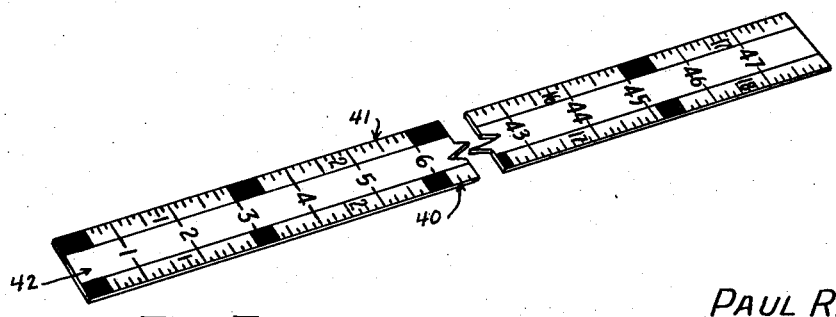
Fig. 7 is a plan view of a tape or strip marked with cooperating indicia patterns embodying my invention.

In Fig. 7 I have illustrated a convenient arrangement wherein two of my vernier indicia patterns, denoted 40, 41, are placed on the same strip or tape with a ruler scale 42 therebetween divided into inches so that the bricklayer can readily see how many bricks to the foot are being laid. The subdivisions of the inches of the ruler scale 42 may be contained along the vernier indicia patterns 40, 41 as shown. It will be noted that patterns 40, 41 have a common length occurring at eighteen graduations of pattern 40 and seventeen graduations of pattern 41. The backface of the strip can also be used for my vernier indicia patterns, and in some instances it may be desirable to have the backface with two such patterns, one with one less graduation than pattern 41, and the other with one more graduation than pattern 40.

Various vernier indicia patterns will of course have to be produced for the different brick sizes. In this regard, my invention can be used for the layout of building products other than bricks, such for example, as tiles, blocks, and panels, and hence it is not intended that the word "brick" be construed as a limitation in the hereto annexed claims.

The advantages of the invention will, it is thought, have been clearly understood from the foregoing detailed description of the embodiment which I have elected to illustrate. Minor changes in the details of the construction will suggest themselves and may be resorted to without departing from the spirit of the invention, wherefor it is my intention that no limitations be implied and that the hereto annexed claims be given a scope fully commensurate with the broadest interpretation to which the employed language admits.

I claim:

1. In layout means for use in masonry construction, two elongated strips having displayed thereon two respective graduated indicia patterns having a vernier relationship, the intervals of said indicia patterns being subdivided to show a common brick thickness with the remainder of each interval representing a joint.

2. In layout means for use in masonry construction, two elongated strips having displayed thereon two respective graduated indicia patterns of the same length with one having one more graduation than the other, the intervals of said indicia patterns being correspondingly subdivided to each indicate a common brick dimension and a remaining respective joint thickness.

References Cited in the file of this patent

UNITED STATES PATENTS

| | | |
|---|---|---|
| 1,594,862 | Unverferth | Aug. 3, 1926 |
| 1,693,227 | Ellis | Nov. 27, 1928 |
| 2,140,714 | Palmer | Dec. 20, 1938 |